Jan. 16, 1951  V. C. MIRONOWICZ  2,538,119
ELECTRIC CONTROL SYSTEM
Filed April 9, 1945  6 Sheets-Sheet 1

INVENTOR.
VLADIMIR C. MIRONOWICZ
BY Frank E. Mauritz
HIS ATTORNEY

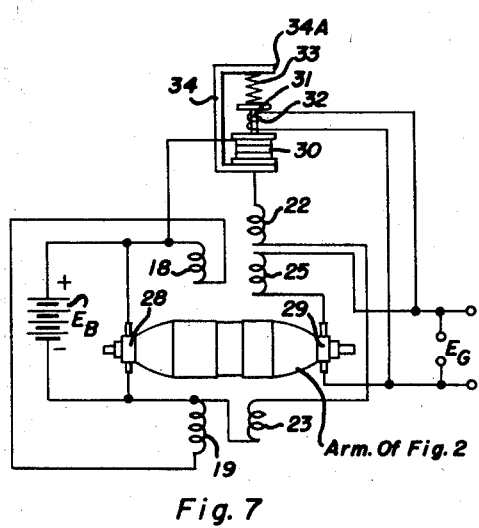
Fig. 7
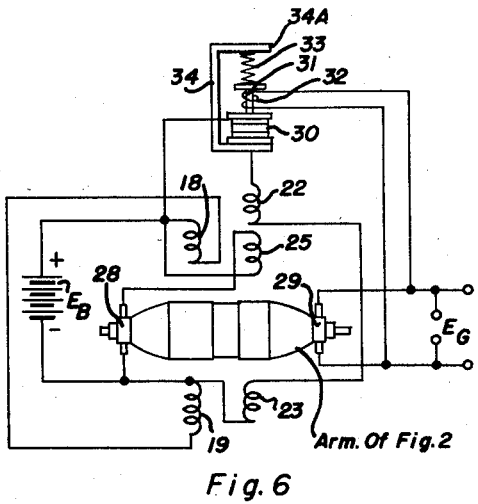
Fig. 6
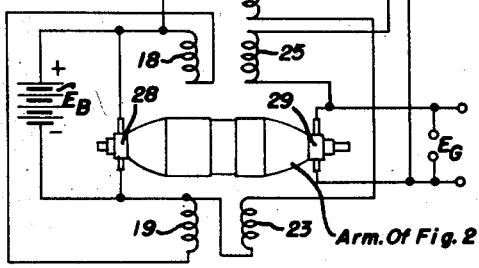
Fig. 9
Fig. 8
INVENTOR.
VLADIMIR C. MIRONOWICZ
BY Frank E. Mauritz
HIS ATTORNEY Jan. 16, 1951  V. C. MIRONOWICZ  2,538,119
ELECTRIC CONTROL SYSTEM
Filed April 9, 1945  6 Sheets-Sheet 3

INVENTOR.
VLADIMIR C. MIRONOWICZ
BY Frank E. Mauritz
HIS ATTORNEY

Jan. 16, 1951      V. C. MIRONOWICZ      2,538,119
ELECTRIC CONTROL SYSTEM

Filed April 9, 1945      6 Sheets-Sheet 4

INVENTOR.
VLADIMIR C. MIRONOWICZ
BY Frank E. Maurity
HIS ATTORNEY

INVENTOR.
VLADIMIR C. MIRONOWICZ
BY Frank E. Mauritz
HIS ATTORNEY

Jan. 16, 1951  V. C. MIRONOWICZ  2,538,119
ELECTRIC CONTROL SYSTEM
Filed April 9, 1945  6 Sheets-Sheet 6

INVENTOR.
VLADIMIR C. MIRONOWICZ
BY Frank E. Mauritz
HIS ATTORNEY

Patented Jan. 16, 1951

2,538,119

UNITED STATES PATENT OFFICE 2,538,119

ELECTRICAL CONTROL SYSTEM

Vladimir C. Mironowicz, Sioux City, Iowa, assignor to Wincharger Corporation, a corporation of Minnesota Application April 9, 1945, Serial No. 587,371

3 Claims. (Cl. 323—12)

This invention relates to an improved dynamotor and, in its broader aspects, to rotating machinery of the motor-generator type, control circuits therefor, and apparatus for producing a maximum flux change in response to relatively small adjustment of a control element.

In the classical dynamotor or converter having a single field and two armature windings on the same core and in which one of the armature windings serves as a motor winding and the other as a generator winding, changes in applied voltage to the motor are reflected as substantially linear changes in the generator output voltage (see curve A of Figure 1). In many instances it is desirable or necessary to maintain a constant voltage output of the dynamotor regardless of changes in applied voltage to the motor portion of the dynamotor in accordance with curve B of Figure 1. This invention relates to an improved dynamotor having the characteristic shown in curve B of Figure 1.

It is desirable to maintain the output voltage of a dynamotor or generator in a motor generator set substantially constant as the input voltage thereto varies, using the smallest amount and weight of auxiliary regulating equipment. It is also desirable that the output voltage be maintained substantially constant by the auxiliary equipment without "hunting." Since weight requirements are especially important in aircraft, it is oftentimes desirable or necessary that the auxiliary equipment necessary to impart a flat output voltage characteristic to a dynamotor or motor generator set for use in aircraft be of small size and weight.

It is therefore an object of this invention to provide new and improved means for keeping the generator voltage of a dynamotor or motor generator set constant as the voltage input thereto varies over a large range without having "hunting."

Another object of this invention is to provide a novel arrangement of dynamotor windings which operate with auxiliary regulating equipment of small size and weight.

Another object of this invention is to provide an improved dynamotor whose speed is relatively constant within the working range of input voltages.

Another object of this invention is to provide an improved dynamotor including speed control means for maintaining generator voltage substantially constant.

Another object of this invention is to achieve the above mentioned objects by simple mechanical and electrical construction in the dynamotor.

Another object of this invention is to provide an improved dynamotor having auxiliary armature and field portions for regulating purposes.

Another object of this invention is to provide a new and improved dynamotor giving substantially constant output voltage as input voltage or load varies.

A further object of the present invention is to provide an arrangement wherein a regulating resistance of small size and small range may be used to control such arrangement over a relatively large operating range.

Still another object of the present invention is to provide a regulating resistance of small size and small range operable in an improved control circuit for maintaining an output characteristic of rotating electrical equipment substantially constant as operation of the equipment is subjected to relatively large variations in power supply, heating, etc.

Background material for the present application may be found in Patent 2,427,919 issued on September 23, 1947, to Vladimir C. Mironowicz and assigned to the same assignee as is this application. Several embodiments shown but not claimed in the present application are claimed in that patent.

The apparatus described in each one of the figures is operated on the same underlying principle, which is believed to be novel to the present applicant for allowing the use of a regulating resistance of relatively small size, weight, power dissipation, etc. in a regulating system for rotating electrical machinery. This principal resides in subjecting a winding in such rotating electrical machinery to differential action for achieving a small regulating resistance. That is, a differential action on an armature winding is obtained in Figs. 2, 4, 5, 6, 7, 8, 9, 16C, 16D, 22 and 24 by subjecting said winding or windings as the case may be to at least two fluxes of different polarity; a differential action is obtained in Figs. 10, 11, 12, 13, 14, 16, 16C, 16D by inducing voltages in an armature winding comprising at least two sections wound in opposite directions; and in the third species of the present invention a differential action is obtained in Figs. 16A, 16B and 16D by transmitting through a common field winding 22 currents flowing in opposite directions. By employing such differential actions alone or in combination good regulating characteristics are obtained and, more important the regulating resistance 30 may be of relatively small size, weight, power dissipation, etc.

The features of my invention, which I believe to be novel, are set forth with particularity in the appended claims. My invention itself, both as to its organization and manner of operation, together with further objects and advantages thereof, may best be understood by reference to the following description taken in connection with the accompanying drawings in which:

Figures 4 to 9 show circuit arrangements for the machine of Figure 2 embodying my invention;

Figure 22:
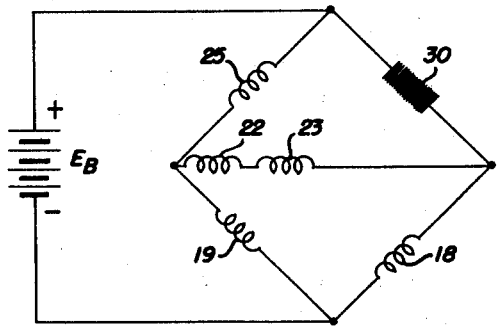
Figure 23:
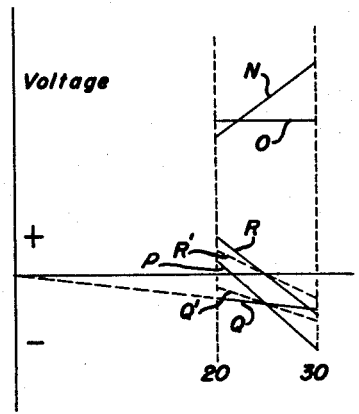
Figure 24:
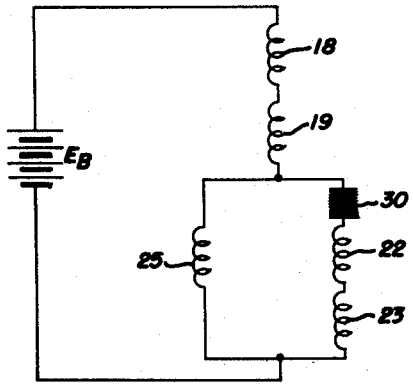
Figure 25:
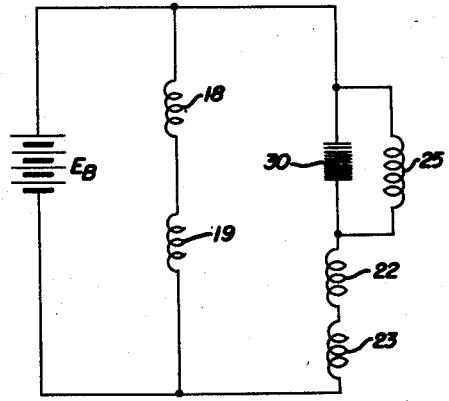

Figures 17 to 21, inclusive, show alternative arrangements for a portion of the embodiments of Figures 4 through 9, 12 and 14;

Figure 22 shows another control circuit embodying my invention;

Figure 23 shows a graphical representative of voltage relations in the dynamotor incorporating the control circuit shown in Figure 22; and Figures 24 and 25 show other simplified control circuits embodying my invention.

Figure 1:
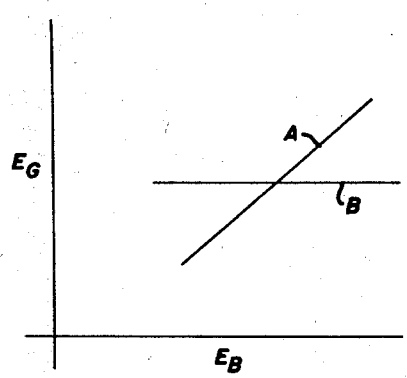
Figure 1 represents graphically the characteristic of a classical dynamotor compared with one embodying my invention.

Referring to the figures wherein like numerals designate like parts, curve A in Figure 1 represents the operating characteristics of a classical dynamotor, and curve B represents the operating characteristics of a dynamotor embodying the features of my invention. The curves A and B are plotted with $E_G$, the output voltages, as ordinates and $E_B$, the input voltages, as abscissae. The improved dynamtor, and circuits therefore, hereafter shown, have a characteristic like the curve B which is substantially invariant over the working range of input voltage, $E_B$.

Figure 2:
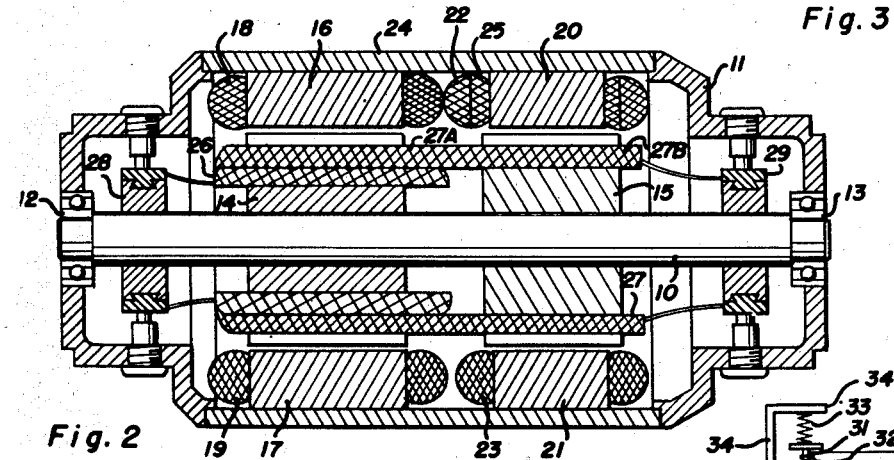
Figure 2 shows a longitudinal section through an improved dynamotor embodying my invention.

In the improved dynamotor shown in Figure 2, armature shaft 10 is rotatively mounted in dynamotor frame 11 by means of bearings or anti-friction means 12 and 13. The armature shaft 10 has securely mounted thereon in spaced relationship the laminated cores 14 and 15. The laminated armature core 14, hereinafter called the main armature core, carries the main sections of the armature windings. The laminated armature core 15, hereinafter called the armature booster or auxiliary core, carries booster or regulating sections of the armature windings. Dynamotor frame 11 has securely mounted thereon oppositely disposed main poles 16 and 17 which carry the main field windings 18 and 19 respectively. Only one pair of main field poles is shown, but it is understood, of course, that the machine may have incorporated therein more than one pair of poles. The poles 16 and 17 on the dynamotor frame are aligned with the cooperating main armature core 14 so as to transmit magnetic flux therethrough.

Poles 20 and 21, securely mounted on the dynamotor frame 11, carry thereon booster or regulating windings 22 and 23 respectively. The poles 20 and 21, hereinafter called the field booster or regulating poles, are in magnetically cooperating relationship with armature booster or auxiliary core 15.

The encircling frame portion 24 serves as a yoke and provides a magnetic flux path between the ends of main field poles 16 and 17. It is understood, of course, that a yoke for main field poles 16 and 17 may take other forms. Also, the encircling frame portion 24 serves as a yoke and provides a magnetic path between booster or regulating poles 20 and 21. The return yoke for booster poles 20 and 21 may, of course, take other forms, as is well known in the art. It is important to note that the magnetic flux path formed by main field poles 16 and 17 and main armature core 14 and yoke 24 is entirely separate and distinct from the magnetic circuit provided by booster field or regulating cores 20 and 21, armature booster or auxiliary core 15 and yoke 24.

Booster or regulating field pole 20 has wound thereon an additional winding 25 which is adapted to produce a magnetic effect on its associated magnetic circuit opposite to that produced by booster or regulating windings 22 and 23. The winding 25 is hereinafter referred to as the differential booster or regulating winding. It is understood, of course, that the differential booster or regulating winding 25 may be a single winding on pole 21 or it may partake of a plurality of windings disposed on both booster or regulating poles 20 and 21, or in other convenient parts of the booster magnetic circuit.

The armature windings of the machine shown in Figure 2 comprise a motor winding 26 and a generator winding 27. The motor armature winding 26 is wound exclusively on the main armature core 14 and is influenced only by magnetic flux from poles 16 and 17. The generator armature winding 27 comprises a main section 27A wound on the main armature core 14 and a generator booster or auxiliary section 27B wound on the armature auxiliary core 15. It is important to note that the generator armature main section 27A is influenced only by magnetic flux from poles 16 and 17, and the generator armature section 27B is influenced only by magnetic flux from booster or regulating poles 20 and 21.

The motor armature winding 26 is electrically connected to a conventional commutator 28 on the left hand side of the machine in Figure 2, and the generator armature winding 27 is provided with a conventional commutator 29 on the right hand side of the machine in Figure 2. Electrical contact is made to the revolving commutators 28 and 29 by using carbon brushes in conventional manner.

Figure 3:
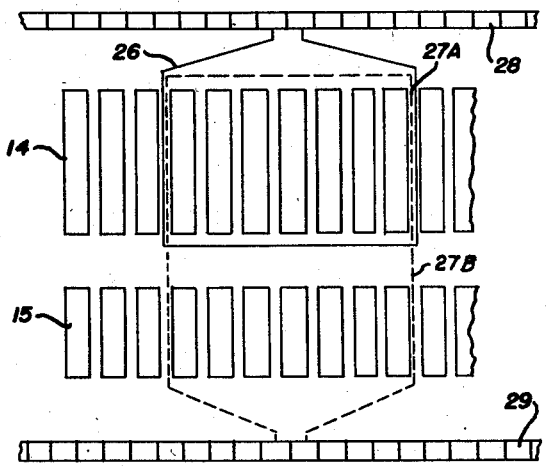
Figure 3 shows the arrangement of generator and motor windings in the machine of the embodiment shown in Figure 2.

Figure 3 is a general schematic view in developed form of the armature cores 14 and 15.

armature generator winding 27, armature motor winding 26 and commutators 28 and 29 in the machine embodying my invention shown in Figure 2. It is understood, of course, that magnetic field poles 16, 17, 20 and 21 are disposed in such relationship to the motor armature winding 26 and the motor generator winding 27 so that opposite coil edges of corresponding armature windings are under poles of opposite polarity. It is noted that the armature motor winding 26 is wound entirely around the armature main core 14, and the generator armature winding 27, comprising sections 27A and 27B, is wound both on main armature core 14 and armature auxiliary core 15.

Figure 4:
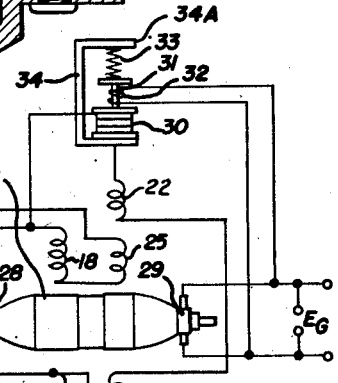

Figure 4 shows the improved dynamotor of Figure 2 connected with an associated circuit for regulating the generator output voltage of the improved dynamotor. The improved dynamotor is energized by a voltage source $E_B$ which may be a battery or other voltage source. The voltage source $E_B$ is connected directly across the motor armature commutator 28 and across the main field windings 18 and 19 and differential booster or regulating winding 25, all connected in series. The booster or regulating windings 22 and 23 are also energized by the voltage source $E_B$ through a series circuit including a variable resistor 30. The resistor 30 is preferably of the pressure dependent type such as resistors made up of loosely packed carbon particles or carbon plates. In the preferred form the resistor 30 is of carbon, and, as the carbon particles or plates comprising the resistor are pressed into engagement with one another, the resistance of the resistor is decreased, and the opposite effect is obtained as pressure on the resistor is reduced. The pressure on resistor 30 may be varied by varying the position of magnetic solenoid plunger 31, which assumes a position depending upon the current flowing through solenoid winding 32. Compression spring 33, disposed between movable solenoid plunger 31 and rigid extension 34A of resistor bracket 34 maintains the resistance of resistor 30 at a predetermined amount when no current flows through solenoid 32. As current through solenoid 32 increases, the plunger 31 rises, thus relieving pressure on the initially spring biased resistor 30, and its resistance value increases. As shown in Figure 4, solenoid winding 32 is connected directly across the generator armature commutator 29.

The operation of the arrangement shown in Figure 4 is as follows: when the voltage source $E_B$ is decreased for any reason whatsoever, the voltage appearing across generator commutator 29 tends to decrease in a manner similar to curve A of Figure 1, if the action of booster coils 22 and 23 and differential coil 25 and associated circuits be disregarded. As the dynamotor output voltage, $E_G$, across commutator 29 decreases, less current flows through solenoid 32 and the compression spring 33, acting against a smaller magnetic force, causes resistance 30 to become smaller. Lowering resistance 30 causes an increase in current flow through the dynamotor booster fields 22 and 23 and the dynamotor output voltage, $E_G$, rises accordingly.

Now, if the action of differential booster winding 25 be considered, as the voltage of source $E_B$ decreases, less magnetic flux from differential booster winding 25 flows through the generator armature booster section 27B, with the net result that a smaller increment of flux has to be supplied from booster windings 22 and 23 in order to maintain the same generator voltage output. The magnetic flux produced by differential winding 25 is, in this instance, a fractional part of the magnetic flux transmitted, due to the action of booster coil windings 22 and 23.

Conversely, when the input voltage $E_B$ increases, the output voltage $E_G$ is maintained constant due to the net effect produced by booster fields 22 and 23 and differential booster field 25, and, secondly, due to variations produced in resistor 30. As the input voltage $E_B$ increases, the output voltage $E_G$ tends to increase; but, since the current through differential field 25 increases also, an increased reverse or "bucking" voltage is induced in the generator armature section 27B, and hence the output voltage $E_G$ tends to increase less rapidly than if the differential field were not present. Accordingly, due to the net effect produced by booster windings 22 and 23 and differential winding 25, only a relatively small adjustment of resistor 30 is necessary to maintain constant output voltage $E_G$. In the absence of differential winding 25, a much greater adjustment of resistor 30 is necessary in order to maintain constant output voltage $E_G$.

Figure 14:
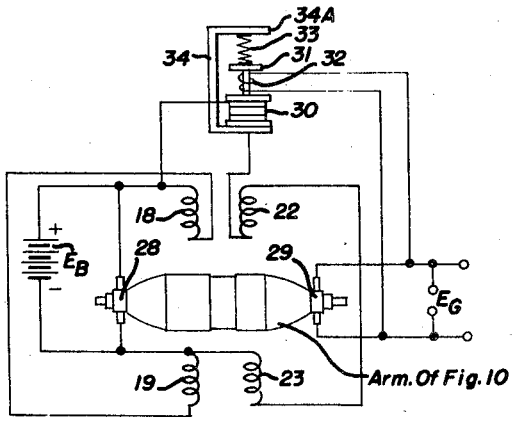
Figure 14A:
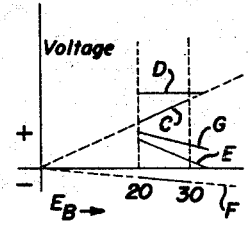
Figures 14A and 15 illustrate schematically certain electrical characteristics of my invention.

The advantage of using a differential winding such as differential winding 25 may perhaps be more readily obtained from an explanation in connection with Figure 14A, wherein is shown the operating characteristics of a dynamotor having no magnetic saturation and in which the effect of IR drops are neglected. Curve C, similar to curve A in Figure 1, represents the variation of voltage generated in generator armature section 27A as the input voltage $E_B$ varies. Curve D represents the desired dynamotor generator output voltage as the input voltage $E_B$ varies. Curve E represents the variation of a corrective voltage which must be added to the voltage represented by curve C in order to obtain a voltage as represented by curve D. Curve F represents the variation of voltage induced in generator armature section 27B due to flux from differential winding 25, and it is noted that this voltage is negative with respect to the other voltages. Curve G represents the variation of voltage induced in generator armature section 27B necessary to obtain corrective voltage as in curve E when the differential winding 25 is present. Corresponding voltages of curves F and G, when added algebraically, give a voltage corresponding to curve E.

Without differential winding 25, the carbon resistor 30 would have to be varied so that the voltage generated in generator booster section 27B varies as shown in curve E, but when the differential winding 25 is present the voltage induced in generator section 27B due to flux from booster windings 22 and 23 need only vary as in curve G. It is important to note that the slopes of curves G and E are substantially different, and in that fact lie the beneficial results obtained by using differential winding 25. That is, since the slope of curve G is not as great as the slope of curve E, a smaller variation of resistor 30 is necessary to produce curve G than to produce curve E.

Figure 5:
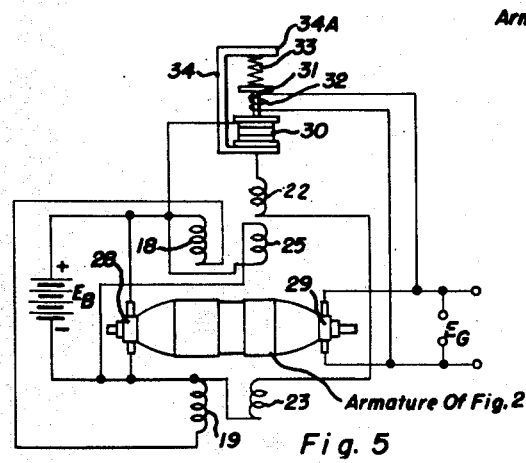

In the arrangement shown in Figure 5 the differential winding 25 is energized directly from the source $E_B$. The magnetic flux produced by differential winding 25 is in opposition to that produced by booster windings 22 and 23.

The operation of the arrangements shown in Figures 4 and 5 is similar, with the exception that the current through differential winding 25 in the arrangement shown in Figure 5 is not dependent upon the main field current flowing through windings 18 and 19 as is the case in the arrangement shown in Figure 4. In the arrangement shown in Figure 4, the winding 25 is a high resistance winding, and hence the modification of Figure 4 with relatively low resistance winding 25 is preferred in cases where $E_B$ is a relatively high voltage.

The operation of the arrangement shown in Figure 6 is substantially the same as for the arrangement heretofore shown in Figure 4, with the exception that the differential booster winding 25 in Figure 6 is connected in a series circuit with the motor armature winding across the source of voltage $E_B$. The booster differential winding 25 in Figure 6 is a low resistance or current winding. The voltage output of the dynamotor is maintained constant not only due to the action of variable resistor 30 but also due to the net effect produced by the booster windings 22 and 23 and the differential winding 25, as is the case in the arrangement shown in Figure 4.

In the arrangements shown in Figures 7 and 8, the differential booster winding 25 is connected in a circuit including the generator armature winding. In the arrangement shown in Figure 7, the differential booster winding is connected in series with the generator armature winding, and the booster winding 25 is a low resistance or current winding. In the arrangement shown in Figure 8, the differential booster winding 25 is connected in parallel with the generator armature winding, and it is a relatively high resistance winding.

The arrangements shown in Figures 7 and 8 operate substantially the same as the arrangement described in Figure 4, namely: the generator voltage output $E_G$ is maintained constant, not only due to the regulating effect produced by variable resistor 30 but also due to the net effect produced by booster windings 22 and 23 and differential winding 25. In the arrangement shown in Figure 7 the differential booster winding 25 is a low resistance or current winding, and in the arrangement shown in Figure 8 the differential booster winding 25 is a high resistance or voltage winding.

In the arrangement shown in Figure 9, the differential booster winding 25 is connected in a series circuit with the solenoid winding 32, and that series circuit is connected across the generator armature output terminals. In this instance, the differential booster winding is a high resistance or voltage winding. The operation of the arrangement shown in Figure 9 is substantially the same as that described for the arrangement shown in Figure 4, with the exception that the differential booster winding 25 is excited from a different portion of the composite dynamotor circuit.

In all of the arrangements shown in Figures 4 to 9, the booster field coils 22 and 23 must supply sufficient magnetic flux to overcome the demagnetizing effect produced by differential winding 25. The output voltage of the generator winding is maintained constant, due, in general, to two effects:

First, the compensating effect produced by variation of variable resistor 30, and Second, the net effect produced by booster windings 22 and 23 and differential booster winding 25.

The form of winding 25, which is preferred in any particular case, depends on the relative voltage or current which excites it. When a low voltage is available for its excitation, the winding 25 may be voltage excited and may have a relatively high resistance and low power dissipation. On the other hand, if a small current is available for excitation of coil 25, it may be of low resistance and current excited with small power loss. In either case the amount of copper necessary is a minimum.

Figure 10:
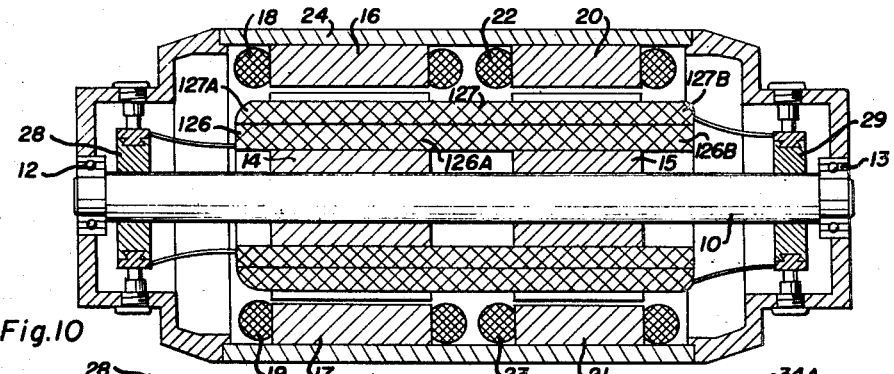
Figure 10 shows a longitudinal section through another improved dynamotor embodying my invention.
Figure 11:
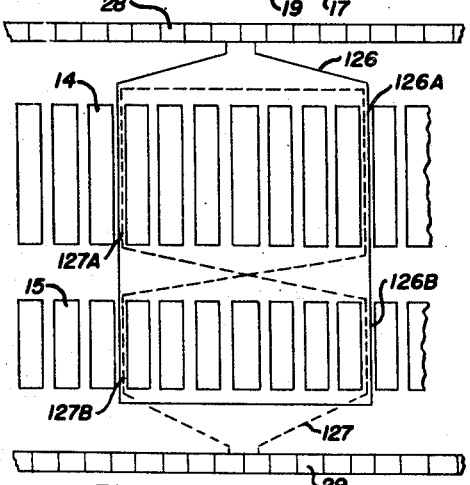
Figure 11 shows the arrangement of windings on the armature of the machine of Figure 10.

The machine shown in Figures 10 and 11 is similar to the machine shown in Figure 2 with a difference that, in the machine of Figure 10, the motor armature winding 126 having sections 126A and 126B extends over to and is wound on the auxiliary armature core 15. Also, the generator armature winding 127 has a main section 127A wound on the main armature core 14 and a reversed section 127B wound on the auxiliary core 15. The machine of Figure 10 has two independent magnetic circuits, that is—a main magnetic circuit comprising main armature core 14; main field poles 16 and 17 and a portion of the dynamotor frame 24 which acts as a yoke; and the auxiliary magnetic circuit which comprises auxiliary armature core 15, regulating field cores 20 and 21 and the magnetic encircling portion 24 which serves as a yoke.

The regulating windings 22 and 23 produce a flux of such polarity that voltage induced in generator armature section 127B is in such a direction as to add to the voltage generated in main generator armature section 127A. The magnetic effect of regulating windings 22 and 23 on the motor armature section 126B, by reason of the reverse relation between motor and generator armature windings on core 15, is to induce a voltage therein in opposition to the voltage induced in main armature winding section 126A by the magnetic effect of windings 18 and 19. In other words, referring to Figure 11, the following voltage relations exist respectively in the generator and motor armature windings:

$$V_{29} = E_{127A} + E_{127B} \quad (1)$$
$$V_{28} = E_{126A} - E_{126B} \quad (2)$$

where $V_{28}$ and $V_{29}$ are the voltages appearing across commutators 28 and 29 respectively, and voltages $E$ in the various armature sections have subscripts corresponding to the members applied to the various armature sections.

If the effect of resistance is neglected, the following relationship must hold:

$$E_B = E_{126A} - E_{126B} \quad (3)$$

Figure 12:
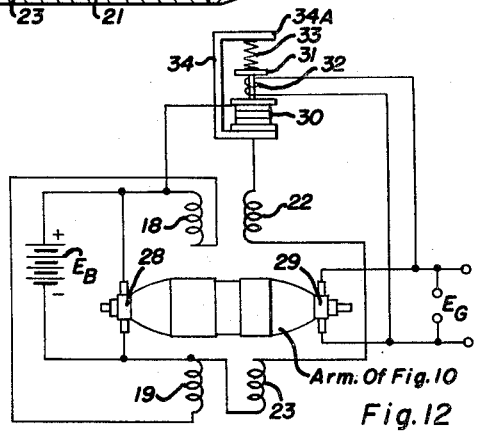
Figures 12 and 14 show circuit arrangements for the machine of Figure 10 embodying my invention.

Figure 12 is a regulating circuit incorporating the dynamotor shown in Figures 10 and 11. The voltage output $E_G$ of the machine shown in Figures 10 and 11 is the voltage generated in main generator armature section 127A plus the voltage generated in generator armature section 127B. That is, $E_G = V_{29}$ of Equation 1. As the generated voltage $E_G$ tends to fall off, for instance: due to a decrease in input voltage $E_B$, Figure 12—the carbon resistor 30—is decreased due to the joint action of generator voltage responsive solenoid winding 32 upon movable magnetic plunger 31 and compression spring 33. As explained above, the resistance of carbon resistor 30 is changed in magnitude to regulate the generator output voltage in such a manner as to make it substantially independent of variations in input voltage $E_B$.

Another regulating effect is introduced due to the electrically reversed motor armature section 126B; that is, as the input voltage $E_B$ decreases the output voltage $E_G$ tends to decrease, but the magnitude of resistor 30 is changed so that the current through regulating field windings 22 and 23 increases and the voltage generated in motor armature section 126B increases, with the net result that the dynamotor speeds up in order that the physical relations represented by Equation 3 above may be satisfied. It is understood, of course, that in the classical dynamotor having a single field and a motor armature winding and a generator armature winding, and in which the motor armature and field coil are both energized from the same source of potential, the speed of the dynamotor is relatively unaffected by changes in the voltage of the source. Therefore, when $E_{126B}$ is increased, voltage $E_{126A}$ must correspondingly increase as by an increase in speed of the dynamotor. However, when the speed of the dynamotor increases, the voltage generated in both sections of the generator armature winding must necessarily increase proportionately.

Thus, the effect of changing the value of resistor 30 in Fig. 12 is, first, to increase directly the voltage $E_{127B}$, and, second, to increase the voltage generated in both of the generator armature sections by producing a speed change in the dynamotor. In apparatus producing only the first of the two above described functions, the carbon resistor 30 is needlessly of large size and large range for the same degree of regulation.

Figure 15:
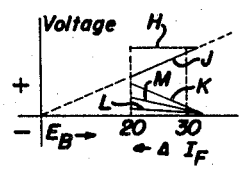

The voltage relationships in the dynamotor of Figure 12 are shown in Figure 15. The curve H shows the desired dynamotor output voltage $E_G$ constant with respect to dynamotor input voltage $E_B$. Curve J shows the variation of voltage in the generator armature section 127A with respect to dynamotor input voltage $E_B$; curve K represents the variation of a corrective voltage which must be added to corresponding voltages on curve J to obtain the desired voltage as shown by curve H. Curve L represents the variation of the component of corrective voltage due to change in speed of the dynamotor when the current through carbon resistor 30 is changed an amount $\Delta I_F$ in the direction indicated on Figure 15; as $E_B$ increases, $\Delta I_F$ decreases, and, conversely, as $E_B$ decreases, $\Delta I_F$ increases. Curve M represents the variation of the component of corrective voltage which is due to the direct effect of magnetic flux on generator armature winding 127B, and curve L is representative of changes in voltages in both sections of the generator armature winding because of change in speed of the dynamotor. Voltages, corresponding to points on curves M and L at the same voltage $E_B$ when added, give voltages corresponding to points on curve K.

Since the slope of curve M is smaller than the slope of curve K, the resistor 30 may be made of much smaller size to produce curve M than to produce curve K without curve L.

Figure 13:
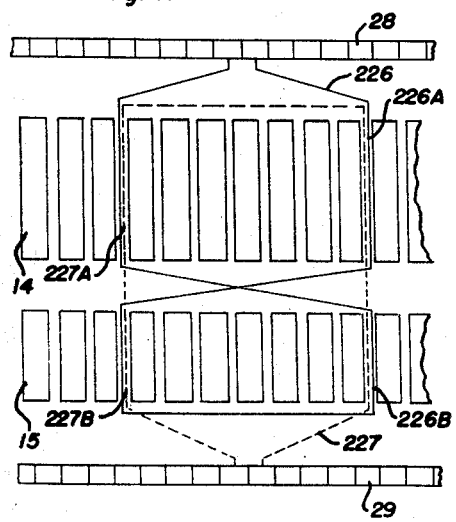
Figure 13 shows modified armature windings for the machine of Figure 10 embodying my invention.

Figure 13 shows modified armature windings for the machine of Figure 10. In Figure 13 the generator armature winding 227 extends substantially the full length of the machine and has sections 227A and 227B wound in additive relationship on main armature core 14 and auxiliary armature core 15, respectively. In Figure 13 the motor armature winding 226 has a main section 226A and a reversed section 226B wound on armature cores 14 and 15 respectively. The driving torque of the dynamotor is supplied by motor armature section 226A with the reversed armature section 226B producing a counter electromotive force therein in opposition to the counter electromotive force induced in section 226A. Using the same nomenclature as above, the voltage relationships in the machine of Figs. 10, 13 and 14 are as follows:

$$V_{29} = E_{227A} + E_{227B} \qquad (4)$$

and $$V_{28} = E_{226A} - E_{226B} \qquad (5)$$

Also, if the effect of resistance is neglected, $$E_B = E_{226A} - E_{226B} \qquad (6)$$

Figure 14 shows a circuit arrangement for the machine of Figure 10 incorporating the armature of Figure 13. Figure 14 is substantially the same as Figure 12, with the exception that the regulating field coils 22 and 23 are reversed in accordance with the reversed connection of the generator and armature windings. That is, the dynamotors of Figs. 12 and 14 are equivalent electrically.

The operations of the arrangements shown in Figures 12 and 14 are substantially the same, and the description for Figure 12 is applicable to the operation of dynamotor shown in Figure 14. In the arrangement shown in Figure 14, the generator output voltage $E_G$ is maintained constant due to two effects, namely—by the regulating effect produced by variable resistor 30 in the manner described above, and, secondly, due to the changes in dynamotor speed resulting from the use of the electrically reverse motor armature section 226B.

Figure 4 shows a preferred embodiment incorporating a differential field winding, and Figure 13 shows a preferred embodiment incorporating reversed armature winding sections. As a practical matter, the particular design chosen should be that one which requires the smallest number of ampere turns in field and armature windings for satisfactory performance in a particular installation.

In the arrangements shown in Figures 12 and 14, the generator booster sections 127B and 227B, respectively, have boosting voltages induced therein due to the regulating fields 22 and 23. In some designs the generator winding section 127B or 227B may be omitted, leaving generator armature section 127A or 227A unaltered. In such case, the dynamotor output voltage is regulated solely by changes in dynamotor speed caused by action of the auxiliary field properly poled. In such a dynamotor, as in Fig. 16, curve L in Figure 15 corresponds to the corrective voltage curve K.

Figure 16:
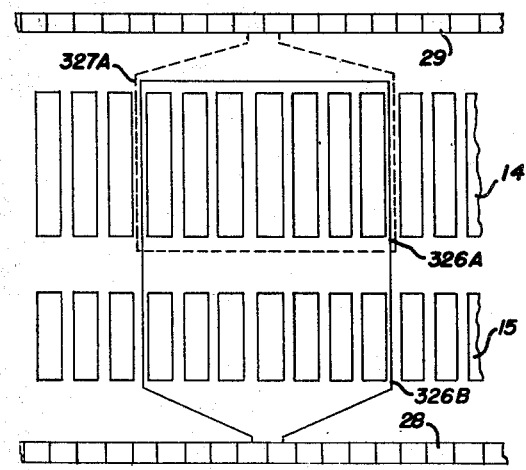
Figures 16 shows a modified arrangement of windings on the armature of the machine of Figure 10.

Figure 16, similar to Figure 11, shows schematically the arrangement of generator armature winding 327A and motor armature winding sections 326A and 326B of a dynamotor in which an output characteristic of the dynamotor may be controlled solely by speed changes in the dynamotor. It is noted that the generator armature winding has only one section 327A, and that the section is wound only on core 14, whereas the motor armature winding comprises the main section 326A and auxiliary section 326B wound on cores 14 and 15, respectively. The armature windings shown in Fig. 16 are subjected to the action of the field windings and associated control apparatus shown in Fig. 12.

Figure 16A:
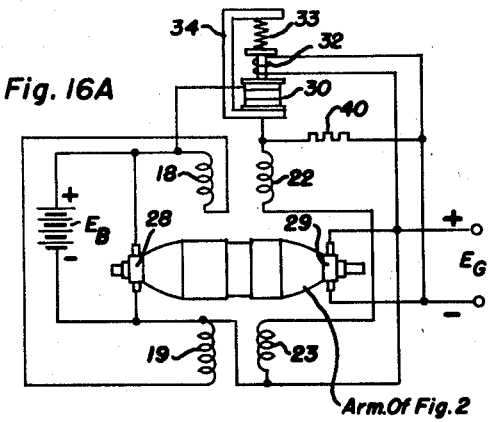
Figures 16A and 16B show circuit arrangements for a machine having the field structure of Figure 10 and the armature of Figure 3.
Figure 16B:
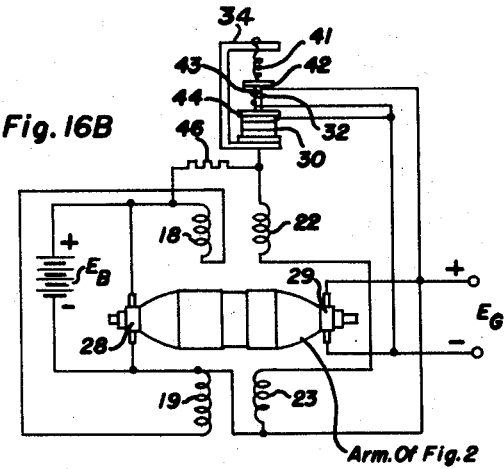

Figs. 16A and 16B show circuit arrangements for a machine having the field structure of Fig. 10 and armature of Fig. 3. These circuit arrangements are each similar to the one shown in Fig. 4, produce the same net result, but, instead of having a pair of differentially connected auxiliary field coils 22, 25, one field coil 22 is used, which is supplied with two currents in buck-boost relationship.

Referring to Fig. 16A, the motor armature winding has its terminals, through commutator 28, connected to opposite terminals of source $E_B$. Source $E_B$ has its positive terminal connected to one terminal of booster winding 22 through regulating resistance 30, the other terminal of winding 22 being connected to the negative terminal of source $E_B$ through the other booster winding 23 of equal flux strength such that a boosting current normally flows from the positive terminal of source $E_B$ down through windings 22 and 23 in Fig. 16A.

The positive terminal of the generator winding is connected through commutator 29 to the lower terminal of winding 23 which is serially connected with winding 22, the upper terminal of winding 22 being connected to the negative terminal of the generator commutator 29 through the current limiting resistance 40 such that a bucking current normally flows from the positive terminal of generator commutator 29 up through windings 23 and 22 in Fig. 16A, through resistance 40 to the negative terminal of generator commutator 29. This flow of bucking current is less than the flow of boosting current and in the opposite direction, whereby the net current in windings 22, 23 is of such magnitude equal to the difference between bucking and boosting currents and in such a direction as to cause the voltage induced in the generator auxiliary section to be in phase with the voltage generated in the main section of the generator armature winding by field coils 18, 19 which are serially connected across the terminals of source $E_B$. The net effect of the connections in Fig. 16A is to cause a relatively large change in flux through the generator armature auxiliary section whenever the voltage at the generator commutator 29 tends to deviate from a predetermined magnitude whereby regulating resistance 30 may be of relatively small size and range to produce additional compensation as the voltage applied to relay coil 32 connected across commutator 29 varies.

In the arrangement in Fig. 16A, when the voltage at the generator commutator 29 tends to decrease below a predetermined magnitude, the bucking current flowing through resistance 40 and coils 22, 23 decreases, the voltage at commutator 29 increases, with the result that regulating resistance 30 need be adjusted only in relatively small amount to restore the voltage to such predetermined magnitude. Conversely, when the voltage at the generator commutator 29 tends to increase above a predetermined magnitude, the bucking current flowing through resistance 40 and coils 22, 23 increases, the voltage at commutator 29 decreases, with the result that regulating resistance 30 need be adjusted only in relatively small amount to restore the voltage to such predetermined magnitude.

The arrangement shown in Fig. 16B operates in the same manner as does the arrangement in Fig. 16A, one outstanding difference in the two arrangements being that in Figure 16A the amount of boosting current is controlled by regulating resistance 30, whereas in Fig. 16B the amount of bucking current is controlled by regulating resistance 30. For this purpose the regulating resistance 30 in Fig. 16B is controlled in a manner quite different than explained previously.

In Fig. 16B, spring 41 is a tension spring having one end fastened to frame 34 and its other end fastened to magnetic armature 42 which in turn is fastened through non-magnetic member 43 to resistance pressure plate 44 such that spring 41 tends to maintain resistance 30 at a relatively high magnitude. When relay winding 32 is energized, magnetic armature 42 tends to move downwardly in Fig. 16B against the action of tension spring 41 until the force exerted by spring 41 balances the magnetic force developed in winding 32.

In Fig. 16B, the terminals of winding 32 are connected to opposite terminals of generator commutator 29 and the associated resistance 30 is connected in series with windings 22, 23 with the upper terminal of coil 22 connected to the negative terminal of commutator 29 such that a bucking current normally flows through resistance 30 and coils 22, 23. Coils 22, 23 are also serially connected across the terminals of source $E_B$ through current limiting resistance 46 with the upper terminal of coil 22 connected to the positive terminal of source $E_B$ such that a boosting current flows downwardly through coils 22, 23 from source $E_B$. This boosting current is of larger magnitude than the bucking current and is in such direction that the voltage generated in generator armature auxiliary section is in phase with the voltage generated in the generator armature main section.

In the arrangement shown in Fig. 16B, when the voltage at the generator commutator 29 tends to decrease below a predetermined magnitude, the bucking current flowing through resistance 30 and coils 22, 23 decreases, the voltage at commutator 29 increases with the result that regulating resistance 30 need be adjusted only in relatively small amount to restore the voltage to such predetermined magnitude. Conversely, when the voltage at the generator commutator 29 tends to increase above a predetermined magnitude, the bucking current flowing through resistance 30 increases, the voltage at commutator 29 decreases, with the result that regulating resistance 30 need be adjusted in relatively small amount to restore the voltage to such predetermined magnitude.

Figure 16C:
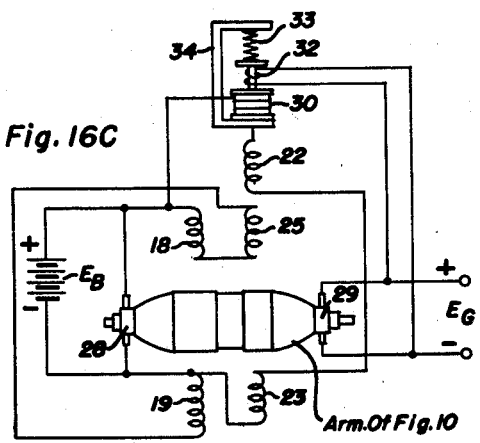
Figures 16C and 16D show circuit arrangements for a machine having the field structure of the machine in Fig. 2 and the armature of Figure 11.

Fig. 16C shows the revolving part or armature of the machine shown in Fig. 10 inserted in the stationary portion of the machine shown in Fig. 2. In such case, the dynamotor has a main regulating winding 22, a differential regulating winding 25, and an armature having a generator armature winding section 127B and a motor armature winding section 126B acted upon by the regulating fields 22 and 25. In that case the dynamotor has differentially acting field means and also differentially acting armature means.

In Fig. 16C when the voltage across the terminals of commutator 29 tends to increase or decrease above a predetermined magnitude, both the differential field winding 25 and auxiliary section 126B of the motor armature winding serve to restore the voltage to such predetermined magnitude with a relatively small size resistance 30 of small range in accordance with principles discussed above. In the absence of either differential winding 25 or auxiliary section 126B of the motor armature winding, the resistance 30 would have to be of larger physical size and range for producing constant voltage in the presence of the same disturbing factors—such as variations in input voltage heating, etc.

Figure 16D:
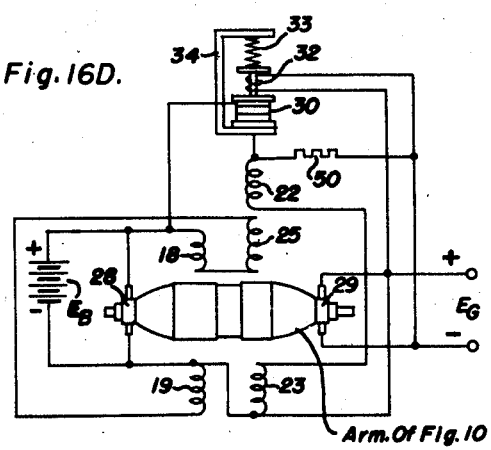

Fig. 16D shows an arrangement similarly incorporating the elements of Fig. 16C and, in addition, shows certain connections from the generator output to the main booster winding 22, 23 in a manner described in connection with Fig. 16A.

In Fig. 16D, the voltage at the generator commutator 29 is maintained constant by utilizing:

(1) The differential field winding 25 in accordance with principles discussed in connection with Figs. 2-9,
(2) The reversed motor armature auxiliary section 128B discussed in connection with Figs. 10, 11, 12 and 16, and
(3) The feedback circuit from generator commutator 29 to winding 22 through resistance 50 (40 in Fig. 16A), which circuit was described in connection with Fig. 16A.

Each one of these three expedients contribute to the maintaining of the generated voltage substantially constant whereby minimum supplementary action produced by variation of resistance 30 is required. Accordingly, resistance 30 may be of relatively small physical size and range in order to produce the relatively small supplementary action required of it to maintain constant output voltage as extraneous factors—such as variation in the driving voltage varies over a considerable range.

Figure 17:
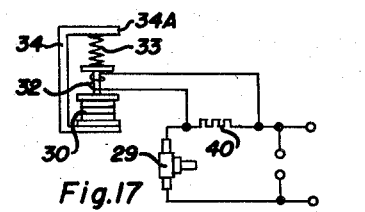

Figure 17 shows an arrangement for producing variations in the variable control resistor 30 in accordance with dynamotor output or generator current passing through a resistor 40. The solenoid coil 32, which is energized in accordance with the voltage drop across resistor 40, tends to cause the carbon resistor 30 to have a relatively high resistance for high output currents and a low resistance for low output currents. Compression spring 33 produces an effect on resistor 30 in opposition to the effect produced on resistor 30 by the flow of current through the solenoid winding 32. When the resistor 30 of Figure 17 is substituted for the corresponding resistor in Fig. 4 or 12, the dynamotor is regulated to produce constant output current.

Figure 18:
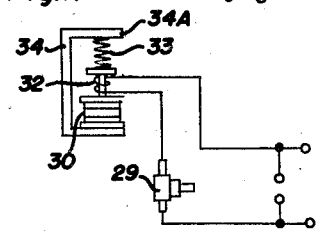

Figure 18 shows another arrangement for maintaining constant output current. The entire output current from generator armature 29 flows through the solenoid winding 32, instead of only a portion, as is the case when there is used a voltage dropping resistor 40. The operation of the arrangement shown in Figs. 17 and 18 is substantially the same in that they both regulate the dynamotor for constant output current. The carbon resistor 30 in Fig. 18 may be substituted for its counterpart in Fig. 4 or 12.

Figure 19:
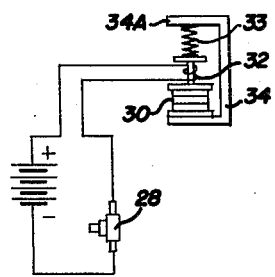

Figure 19 shows an arrangement for varying the carbon resistor 30 in accordance with the current flowing in the dynamotor armature circuit. Compression spring 33 and solenoid coil 32 when energized produce opposite effects on carbon resistor 30. That is, when current flows through solenoid coil 32, the carbon resistor 30 is compressed in direct proportion to the current flowing through coil 32 so that when relatively small curents flow in the motor armature 28 the resistor 30 in the absence of compression spring 33 tends to have a low resistance and, when relatively large currents flow in armature circuit 28, the resistor 30 tends to have a high resistance. The resistor 30 of Figure 19 may be substituted for its counterpart in the circuit of Fig. 4 or 12.

Figure 20:
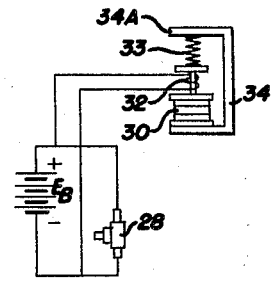

Fig. 20 shows an arrangement for varying the resistor 30 in accordance with variations of the battery voltage $E_B$. Compression spring 33 and solenoid coil 32, when energized, produce opposite effects on the resistor 30. When the voltage of the input source $E_B$ is low, the current through solenoid coil 32 is low, since it is connected across the voltage source, and consequently the resistance of resistor 30 is low. When the voltage of source $E_B$ is high, solenoid 32 counterbalances to some extent the effect of compression spring 33 and the resistance of resistor 30 is high. The resistor 30 of Fig. 20 may be substituted for its counterpart in Fig. 4 or Fig. 12.

Figure 21:
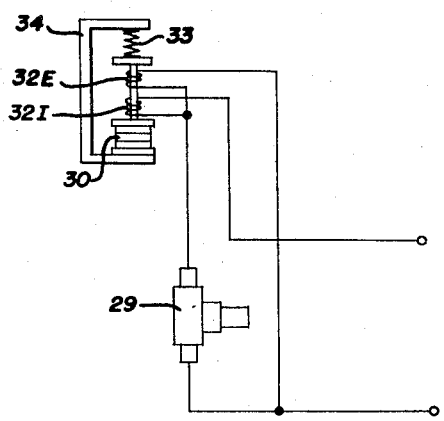

Fig. 21 shows an arrangement for regulating the improved dynamotor substantially in accordance with a constant power output. When output current flows from generator armature 29, the magnetic effects produced by solenoid coil 32E and 32I are in additive relationship and produce an effect on resistor 30 in opposition to the effect produced by compression spring 33 on resistor 30. It is understood, of course, that power in an electrical circuit is the product of the voltage and current in that circuit. By causing the magnitude of resistor 30 to have a magnitude depending upon the current and also voltage in the output circuit, as shown in Fig. 21, the dynamotor is regulated in accordance with a function of the power output. It is understood, of course, that the resistor 30 in Fig. 21 may be substituted for its counterpart in either Fig. 4 or Fig. 12.

Fig. 22 shows another control circuit for the dynamotor heretofore described. The field windings, variable carbon resistor, and input voltage source $E_B$ of, for example, the dynamotor of Fig. 4, form arms of a modified bridge circuit. Main field winding 19 is connected across the voltage source $E_B$ through a series circuit including differential field coil 25. The other main field winding 18 is connected across the voltage source $E_B$ through a series circuit including the variable carbon resistor 30. Main booster or regulating fields 22 and 23 are connected in series, form a point between coils 19 and 25 to a point between coil 18 and resistor 30, and form a current path between the ends of main field coils 18 and 19. The control circuit shown in Fig. 22 is particularly suitable for use where the current through the regulating windings 22 and 23 is reversed, as is the case when the voltage relations shown in Fig. 23 exist.

Referring to Fig. 23, the curve O shows the desired characteristic of the dynamotor. Curve N shows the variation of voltage generated in the main armature section of the dynamotor due to the influence of main field 18 and 19. For purposes of analysis, the curve N is considered to be substantially linear over the voltage range shown in full lines in Fig. 23. Curve P represents the variation of corrective voltage which must be supplied from the auxiliary or booster portion of the dynamotor and added to the corresponding voltage represented by curve N to obtain the desired voltage represented by curve O. Curve Q (shown in full line) represents the variation of voltage which is induced in the auxiliary armature section of the dynamotor due to differential field 25. Curve R (shown in full line) represents the variation of voltage induced in the generator armature auxiliary section 27B due to current in the main booster windings or regulating windings 22 and 23. Corresponding ordinates on curves R and Q when added algebraically are equal to corresponding ordinates on corrective voltage curve P, and therein lies the essence of my invention. In the absence of differential winding 25, resistor 30 would have to produce the variation shown in curve P. Resistor 30 need be of smaller range to produce curve R than to produce curve P.

It is noted that with the bridge arrangement shown in Figs. 22 and 23, the current in the regulating or booster windings 22 and 23 is zero midway between the range of voltages of $E_B$ and assumes positive and negative values on either side of that midway point.

As seen from Fig. 23, the smaller the slope of curve R, the smaller must be the range of resistor 30 to produce the curve R. Another important feature of the circuit shown in Fig. 22 is that it is possible with the particular arrangement of field coils and resistance 30 to make the slope of the curve R even less than is shown, so that it becomes curve R' (shown in dotted lines in Fig. 23).

In the graphical representation shown in Figs. 14A and 23, it is noted that the greater the slope of curves F and Q, the smaller need be the slopes of curves G and R in Figs. 14A and 23, respectively, in order to produce the corrective voltage curves E and P. When E is 20 volts (Figs. 22 and 23), resistor 30 is adjusted to its lowest resistance and maximum current flows through it and through the main booster fie'ds 22 and 23 and main fields 18 and 19. But since resistor 30, in effect, shunts the differential coil 25, that is, since an increased voltage appears across winding 19, the voltage across differential coil 25 is reduced by reduction of resistance 30, thus causing the left hand point on curve Q to appear as the left hand point on curve Q' (shown in dotted lines).

When $E_B$ is 30 volts, the resistor 30 is adjusted to its highest resistance and most of the current in the main booster or regulating fields 22 and 23 flows through differential field 25 and main field 18, thus causing an increased voltage to appear across differential coil 25 and causing displacement of the right hand point on curve Q to the right hand point on curve Q'. The net result is that the slope of the curve Q, by the adjustment of resistance 30 in the bridge circuit, is greater than would otherwise be expected as indicated by curve Q'. Consequently, the slope of curve R need be smaller to an extent indicated by curve R', and accordingly the resistor 30 need have a smaller range to produce curve R' than to produce curve R.

Figs. 24 and 25 show additional circuit arrangements for causing mutual changes in the slopes of the booster voltage and differential booster vo!tage characteristic curves. The beneficial result obtained from the arrangements shown in Figs. 24 and 25 is to cause the voltage across differential field 25 to be high when the voltage across the main booster or regulating fields 22 and 23 is low, and, conversely, to cause the voltage across differential field 25 to be low when the vo!tage across main booster or regulating fields 22 and 23 is high.

In the arrangement shown in Fig. 24, the voltage source $E_B$ is connected in series with the serially connected main field coils 18 and 19 and with a parallel circuit including differential field coil 25 in one arm of the parallel circuit and with the variable carbon resistor 30 and main booster fields or regulating fields 22 and 23 in series relation in the other arm of the parallel circuit. When the resistance of carbon resistor 30 is lowered, an increased voltage appears across coils 22 and 23 and also across coils 18 and 19. Consequently, the voltage across differential coil 25 decreases. When the value of resistor 30 is increased, a smaller voltage appears across coils 22 and 23 and a greater voltage appears across differential coil 25.

In the arrangement shown in Fig. 25, the voltage source, $E_B$ is connected directly across the serially connected main field coils 18 and 19. Also, the voltage source $E_B$ is connected in series with the main regulating or booster windings 22 and 23 through a parallel circuit including variable carbon resistor 30 in one arm of the parallel circuit and the differential field 25 in the other arm of the parallel circuit. As the resistance of resistor 30 is lowered, the voltage drop across differential field coil 25 is lowered and the voltage appearing across coils 22 and 23 is increased; and, conversely, when the resistance of resistor 30 is increased, the voltage appearing across differential field coil 25 is increased and the voltage appearing across main field coils 22 and 23 is lowered.

With the arrangements shown in Figs. 24 and 25, the slope of the component of corrective voltage supplied from the main regulating fields 22 and 23 is effectively lowered in accordance with the same principles which cause curve R in Fig. 23 to assume the position indicated by the dotted curve R'.

In all of the arrangements shown, the voltage induced in the auxiliary armature sections due to the action of the differential field 25 of the dynamotor preferably never exceeds the voltage induced in that auxiliary section due to the action of main booster field 22. The advantage of using the differential field 25 for reducing the range of carbon resistor 30 may be seen from the following specific case wherein differential winding 25 is fed from a constant voltage source, for example: from a constant voltage source such as $E_G$, as shown in Fig. 8.

In the arrangement shown in Fig. 8, when the differential winding 25 is present, $$E_G = E_{27A} + E_{27B} = E_{27A} + V_{22} - V_{25}$$

and when the differential winding 25 is absent, $$E_G = E_{27A} + E_{27B} = E_{27A} + V_{22}$$

where $E_{27A}$ and $E_{27B}$ represent voltages generated in those generator armature sections bearing reference numerals corresponding to the subscripts; where $V_{22}$ and $V_{25}$ represent voltages induced by regulating windings 22 and 25 respectively; and where $V_{22}'$ represents the voltage which must be induced by regulating field 22 when the differential field 25 is absent.

For a given voltage change in the generator armature section 27A equal to $\Delta E_{27A}$, the following percentage changes must occur in the voltage generated by the coil 22 in the two cases under consideration. When the field 25 is present, the percent change is:

$$\frac{\Delta E_{27A}}{E_G + V_{25} - E_{27A}}$$

and when the field 25 is absent, the percent change is:

$$\frac{\Delta E_{27A}}{E_G - E_{27A}}$$

Thus it is seen from the last two equations that the percent change in generated voltage produced by regulating coil 22 and associated resistor 30 must be higher when the regulating field 25 is absent.

The revolving part or armature of the machine shown in Fig. 10 may be inserted in the stationary portion of the machine shown in Fig. 2 as shown in Fig. 16C. In that case the dynamotor has a main regulating winding 22, a differential regulating winding 25, and an armature having a generator armature winding section 127B and a motor armature winding section 126B acted upon by the regulating fields 22 and 25. In that case, the dynamotor has differentially acting field means and also differentially acting armature means. The regulating resistor 30 in that instance is of small size because the beneficial result obtained from the use of differential field windings is realized in addition to the beneficial results obtained from the use of reversed armature windings in accordance with principles explained above. Also, the field structure shown in the machine of Fig. 2 may cooperate with the other armature windings which are disposed as shown in Figs. 11, 13 and 16.

In the dynamotor shown herein, there are two different types of differentially acting means. The first differentially acting means is typified by the joint action of regulating winding 22 and its "bucking" or differential winding 25. The second differentially acting means is typified by the armature winding having a main section and an auxiliary section of such electrical polarity as to produce a "bucking" or differential effect on the main armature section. The first mentioned differentially acting means is effective in changing the field characteristics of a dynamotor, and the second mentioned differential acting means is effective in changing polarities of different sections of the armature windings.

In the composite dynamotor control system there is another means termed a differentially acting means. In Fig. 4, for example, there is a differentially acting means acting on the carbon resistance 30. That is, the net force on carbon resistance 30 is the force exerted by compression spring 33 minus the magnetic force produced by current in winding 32. It is understood from this explantion that the term "differentially acting means" when used in this specification and claims designates a means which produces at least two effects which act in opposite directions to produce a net effect.

For purposes of definition, it is understood that in the arrangement shown in Figs. 2, 4–9, 16C, 16D, 22, 24 and 25, the field coils 22, 25 are flux producing means including at least one field coil arranged to produce two fluxes having mutually opposite effects on an armature winding. In Figs. 10, 12, 14, 16C and 16D the field coils 18, 22 are flux producing means including at least one field coil arranged to produce two fluxes having mutually opposite effects on an armature winding. Also, in Figs. 16A, 16B and 16D, winding 22 has two unequal and opposite currents flowing therethrough and is a flux producing means including at least one field coil arranged to produce two mutually opposite effects on an armature winding.

While I have shown and described the particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

I claim:

1. The combination, in apparatus for regulating an output characteristic of a motor generator set, of flux producing means, a motor armature winding having a main section and an auxiliary section electrically reversed with respect to said main section, a generator armature winding having a main section and an auxiliary section and extending substantially coextensively with said motor armature winding, means for producing relative movement between said armature winding and flux producing means, said flux producing means including three field coils, a first one of said field coils arranged to transmit flux through the main sections of said motor and generator armature windings, a second one of said field coils being arranged to transmit flux through the motor reversed armature section and generator armature such that the voltage induced in the generator armature auxiliary section by said second field coil is in additive relationship to the voltage generated in the generator main section by said first field coil and the voltage generated in the motor armature reversed section is in opposition to the voltage induced in the motor armature main section by said first field coil, a third one of said field coils arranged to transmit flux through said motor armature reversed section and generator auxiliary section in opposition to the flux transmitted by said second field coil, means for transmitting unequal and opposite currents through at least one of said field coils, and means comprising a variable impedance included in the circuit of said last mentioned field coil and responsive to variations in the output current of said generator for adjusting automatically one of said currents to maintain said output characteristic constant.

2. In a motor generator set including an armature winding, flux producing means, means for producing relative movement between said armature winding and said flux producing means, and an output circuit, apparatus for regulating an output characteristic of said motor generator set comprising: a regulating field coil included in said flux producing means; a pair of energizing circuits connected to said coil to supply currents in opposite senses through said coil to produce a net regulating magnetic flux for said armature winding in a sense and degree determined by the differential effect of said currents; a solenoid coupled to said output circuit to be energized in accordance with the output of the generator portion of said motor generator set; and a variable impedance included in one of said energizing circuits and controlled by said solenoid to present an impedance value determined by the energization of said solenoid, whereby the current through said one energizing circuit and said regulating flux are adjusted to regulate said output characteristic of said motor generator set.

3. In a motor generator set including an armature, flux producing means, means for producing relative movement between said armature and said flux producing means, and an output circuit, apparatus for regulating an output characteristic of said motor generator set comprising: an armature winding rotatable with said armature and including a main section and an electrically reversed section; a primary field portion included in said flux producing means and disposed in the vicinity of said main armature winding section; a regulating field coil included in said flux producing means and disposed in the vicinity of said electrically reversed armature winding section; a pair of energizing circuits connected to said coil to supply currents in opposite senses through said coil to produce a net regulating magnetic flux for said electrically reversed armature winding section in a sense and degree determined by the differential effect of said currents; a solenoid coupled to said output circuit to be energized in accordance with the output of the generator portion of said motor generator set; and a variable impedance included in one of said energizing circuits and controlled by said solenoid to present an impedance value determined by the energization of said solenoid, whereby the current through said one energizing circuit and said regulating flux are adjusted to regulate said output characteristic of said motor generator set.

VLADIMIR C. MIRONOWICZ.

REFERENCES CITED

The following references are of record in the file of this patent:

UNITED STATES PATENTS

| Number | Name | Date |
|---|---|---|
| 1,211,802 | Woodbridge | Nov. 26, 1913 |
| 1,436,152 | Churchward | Nov. 21, 1922 |
| 1,468,159 | Holifield | Sept. 18, 1923 |
| 1,690,142 | Tanner | Nov. 6, 1928 |
| 1,962,992 | Leece et al. | June 12, 1934 |
| 2,018,108 | Allen | Oct. 22, 1935 |

Certificate of Correction

Patent No. 2,538,119     January 16, 1951

VLADIMIR C. MIRONOWICZ

It is hereby certified that error appears in the printed specification of the above numbered patent requiring correction as follows:

Column 3, line 49, for the word "representative" read *representation*; column 12, line 24, for "EB" read $E_B$; column 16, line 44, for that portion of the equation reading "$V_{22}$" read $V_{22'}$;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*